N. FELIZIANETTI.
FRUIT CAN DRAINING MACHINE.
APPLICATION FILED JULY 12, 1915.
1,202,171.
Patented Oct. 24, 1916.
5 SHEETS—SHEET 4.
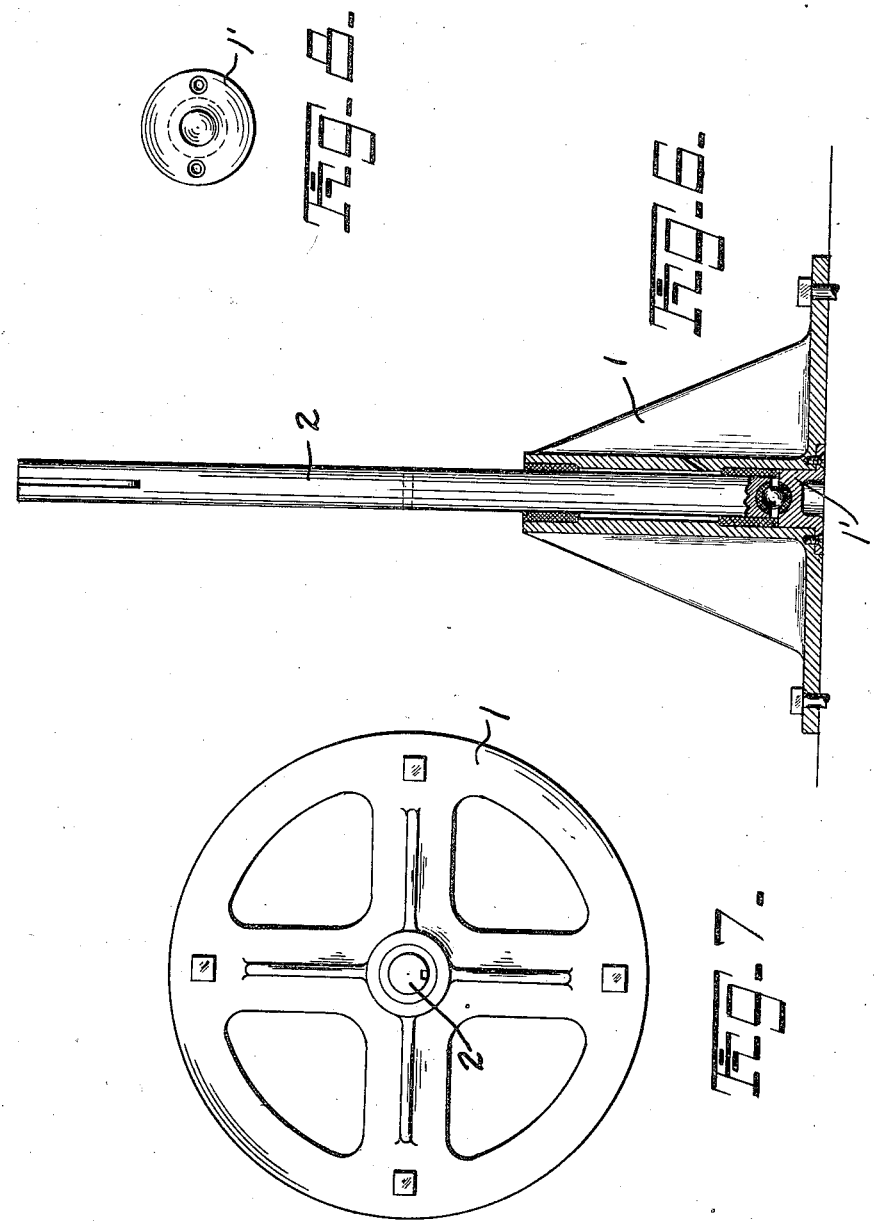
WITNESSES:
INVENTOR.
NARSETE FELIZIANETTI
BY
Carlos P. Griffin
ATTORNEY.

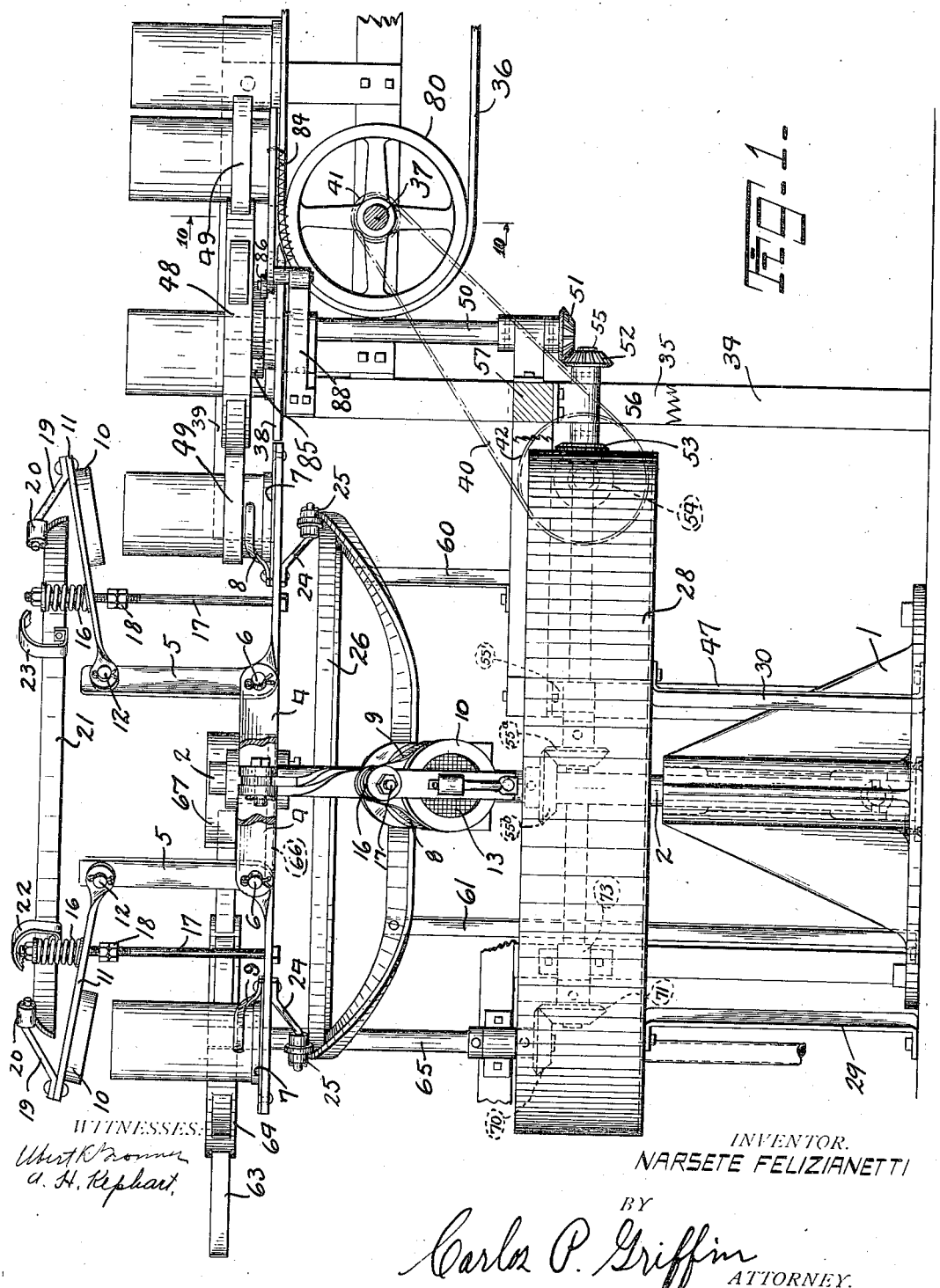

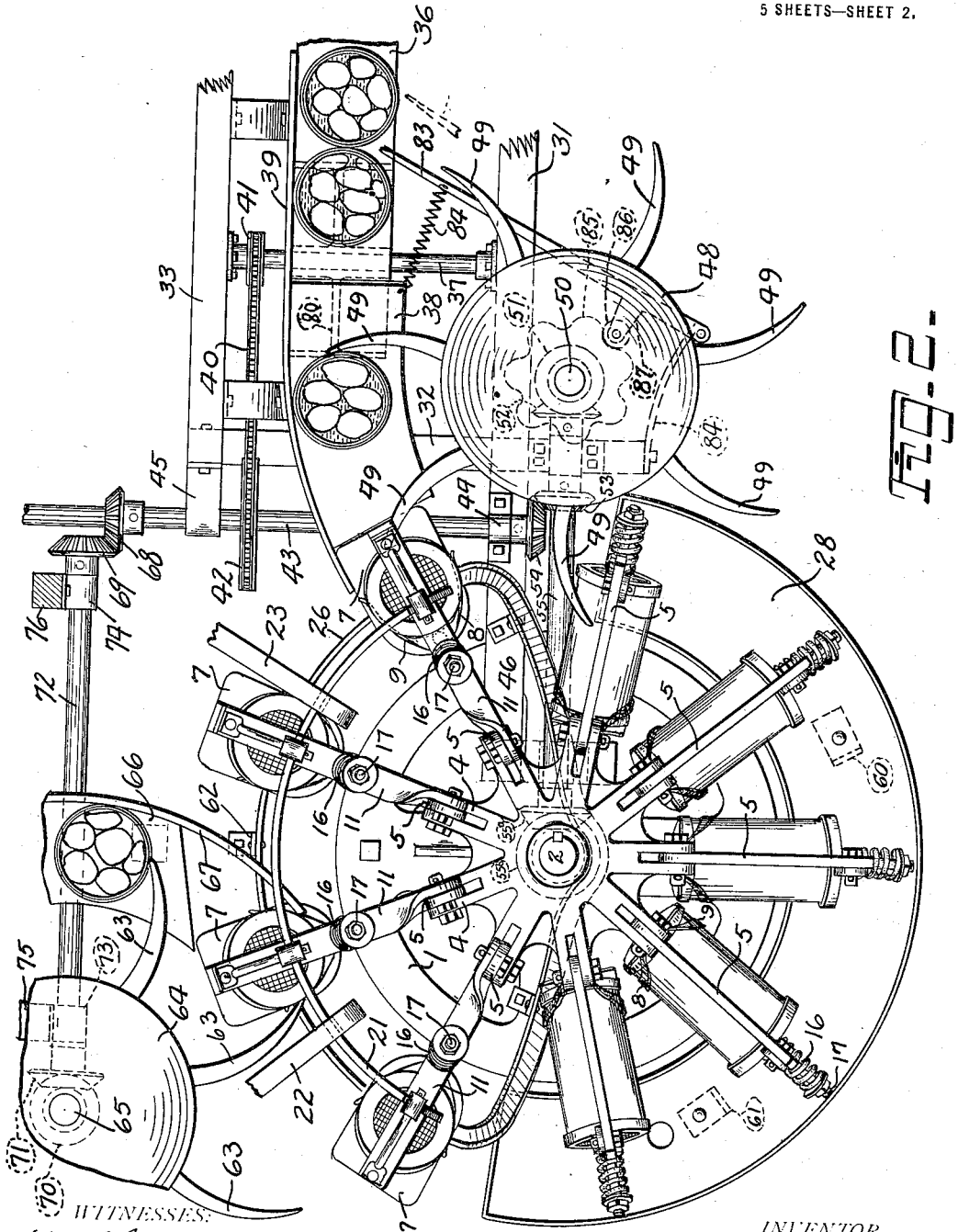

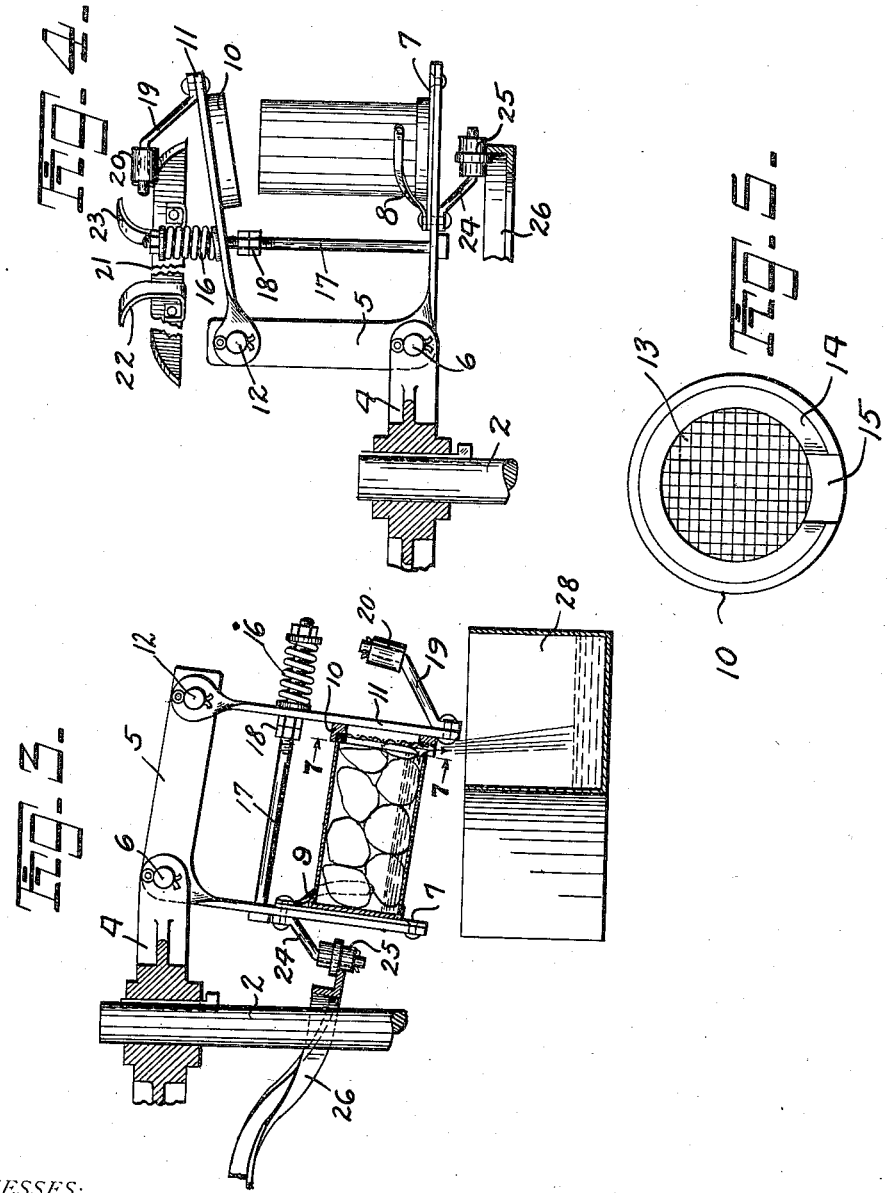

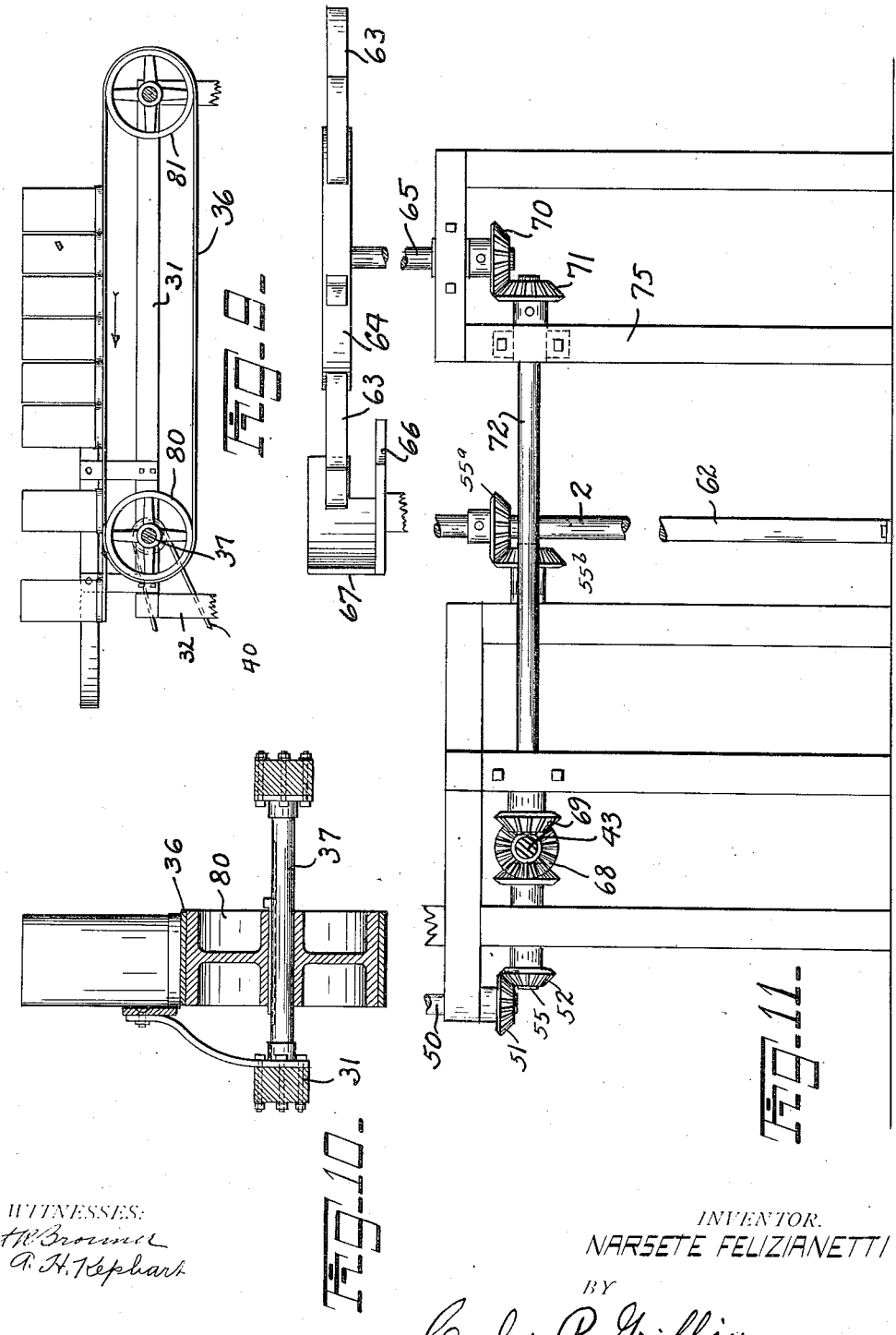

UNITED STATES PATENT OFFICE.

NARSETE FELIZIANETTI, OF MARYSVILLE, CALIFORNIA.

FRUIT-CAN-DRAINING MACHINE.

1,202,171.   Specification of Letters Patent.   Patented Oct. 24, 1916.

Application filed July 12, 1915.   Serial No. 39,526.

*To all whom it may concern:*

Be it known that I, NARSETE FELIZIANETTI, a subject of the King of Italy, residing at Marysville, in the county of Yuba, State of California, have invented a new and useful Fruit-Can-Draining Machine, of which the following is a specification in such full and clear terms as will enable those skilled in the art to construct and use the same.

This invention relates to a machine for draining fruit cans after they have received their charge of fruit wet from the preliminary treating operations.

It will be understood by those skilled in the art that in the canning of fruit it is necessary to scald or wash or lye-dip the fruit before it is put into the cans, after which the fruit must be drained of its water or washed to have the syrup placed thereon.

An object of the invention is to provide a machine which will be entirely automatic, receiving and discharging the cans of fruit without attention from an operator.

An embodiment of the invention is shown in the drawing in which the same reference numeral is applied to the same portion throughout, but I am aware that there may be many modifications thereof.

Figure 1 is a side elevation of the complete machine, Fig. 2 is a plan view of the complete machine, Fig. 3 is a side elevation of one of the can holding arms illustrating its position when the liquid is being allowed to drain out of the can, Fig. 4 is a side elevation of one of the can holding arms illustrating its position just prior to the can being secured thereto by the spring pressed gasket, Fig. 5 is a view in elevation of the screen for holding the fruit in the cans when the liquor is being drained therefrom, Fig. 6 is a sectional view illustrating the spider supporting shaft and the base bearing therefor, Fig. 7 is a plan view of the base bearing, Fig. 8 is a bottom plan view of the step bearing for the support of the main spider shaft, Fig. 9 is a side elevation of the belt conveyer used for delivering the cans to the draining machine, Fig. 10 is a sectional view on the line 10—10 Fig. 1 showing the side guide strip to direct the cans in alinement with the draining arms, and Fig. 11 is an elevation of the machine looking in the opposite direction illustrating the driving mechanism below the cam for raising and lowering the cans.

The numeral 1 represents a base plate which provides a journal for the vertical shaft 2, said shaft carrying a spider 3 at its upper end, which spider supports the can holding arms 4 for nine of the L shaped can holders 5, said can holders being pivoted to the arms 4 at 6. The outer end of the can holding arms is widened as indicated at 7 to receive the cans and it is provided with two arms 8 and 9, two for each can holding receptacle or arm, to properly position the cans when moved into place. In order to hold the cans after being placed between the arms 8 and 9 a screened cap 10 carried by an arm 11 pivoted to the top of the arm 5 at 12 is used. The cap 10 has a screen 13 and a rubber gasket 14 with a portion cut away at 15 to allow the escape of fluid from the fruit placed in the cans.

The arm 11 is held normally against the can by means of a spring 16 carried by a rod 17, which rod has two nuts at 18 to determine its position. When the can is to be placed on the arms the cap 10 is lifted by means of a projection 19 carried by the arm 11, which projection has a roller 20 capable of passing up over the cam 21, said cam being supported by brackets 22, 23 extending outwardly from the machine to a suitable support.

In order to raise and lower the cans a bracket 24 is carried by the lower portion of the arm 5, which bracket carries a flanged roller 25 which rides on a cam track 26, said track being so shaped as to allow five of the cans to be draining at one time while four of the arms are in position to receive a can, to discharge a can, and move from one position to another. The five cans which are down, note Fig. 2, drain into a semi-circular trough 28, said trough being supported on legs 29, 30.

At one side of the machine there is a frame work 31, 32 33 only a portion of which is illustrated and which is supported by two posts 34, 35 which carries the can feeding apparatus, not a part of this invention. The can feeding apparatus comprises an endless conveyer 36 passing around a suitable wheel on a shaft 37 and discharging its cans upon the shelf 38, said shelf and conveyer having a fixed side piece 39 to prevent the cans from being pushed off the shelf. The conveyer 36 is driven from the sprocket chain 40 by means of the sprocket wheels 41, 42, the latter on the shaft 43 which shaft has the main driving shaft for the machine.

The shaft 43 is supported in journal bearings 44, 45, the former of which is bolted to a horizontal bar 46 supported by the post 35 and post 47. The cans are fed into place by means of the feed wheel 48 which feed wheel has arms 49 projecting therefrom to contact with the cans and shove them into place on the can holding arms. The wheel 48 is supported by means of a vertical shaft 50 and is driven from the main shaft by means of bevel wheels 51, 52, 53, and 54, the latter being on the main shaft 43, while the wheels 52 and 53 are on a shaft 55 carried in a journal box 56 on the inside of a cross bar 57 connecting the two posts 34, 35. The cam track 26 is supported by three posts 60, 61 and 62. The shaft 55 is also supported in a box 55' and has a gear 55$^a$ to drive a gear 55$^b$ on the shaft 2.

The cans are discharged from the machine by having the rollers 20 first ride up on the track 21, after which the arms 63 of a wheel 64 on a shaft 65 push them off the arms into a chute 66. The chute 66 has a vertically extending side 67 to prevent the cans from being pushed sidewise therefrom. The discharge wheel is driven from the main shaft 43 by means of a bevel gear 68, bevel gear 69 and two bevel gears 70, 71, a horizontal shaft 72 supporting the two gears 69 and 71. The shaft 72 is carried by two boxes 73, 74 on two suitable posts 75, 76.

The operation of the machine is as follows: Cans are placed by hand on the belt conveyer 36 and as it pushes them along on a table 38 they are successively pushed by the arms 49 into place on the draining arms. The belt conveyer 36 and other parts are suitably geared to move at the proper times to deliver the cans from one portion of the apparatus to another without crowding. As the cans are pushed into place on the draining arms the screen caps are allowed to come down into contact with the cans by moving off the cam track 21 after which the arms ride down on the track 26 until they assume the position illustrated by the five lower cans in Fig. 2, whereupon the arms 49 can clear the several parts of said arms as they move around. As the apparatus moves around the cam 26 finally lifts the cans to the upright position, whereupon the cam 21 will raise the cap off each can successively and the cans will then be pushed into the discharge chute 66 by the arms 63.

It will be understood by those skilled in the art that the machine here illustrated does only one step in the ordinary canning operations, namely; the step of draining the fruit prior to its further treatment.

The base 1 is provided with a plate 1' which fits within the same below the shaft to support said shaft.

The can conveyer 36 passes over the sprocket wheels 80, 81 which are spaced apart such a distance as will provided a suitable length of table for the placing of the cans by the attendants and in order to prevent the conveyer from overcrowding the feeding apparatus, an arm 83 is pivoted on a bracket 84 carried by the frame work 32 to stop the cans. This arm is pulled into position indicated in Fig. 2 by means of the spring 84' and is moved outwardly by the cam 85 on the feed wheel shaft, said cam bearing on a roller 86 carried by a lug 87 on the arm 83. The result of this construction is that the cans will be held by the arm except when the cam moves the arm out of the way and permits the can to pass forward and as soon as the can has moved forward the arm will move back and hold the next can from passing up on to the feed table 38.

Having thus described my invention what I claim as new and desire to secure by Lettents Patent of the United States, is as follows, modifications within the scope of the claims being expressly reserved:

1. A can draining machine comprising a revoluble spider, a plurality of vertically movable arms pivoted thereto, a screen cap to secure a can in place on each arm, a cam track on which the arms ride shaped to allow the cans to turn below the horizontal to drain liquids therefrom during a portion of the movement of the cans around the machine and an annular trough below the cans to receive said liquids.

2. A can draining machine comprising a revoluble spider, a plurality of vertically movable arms carried by the spider, a screen cover cap carried by each arm, means to position a can on each arm as it successively moves into a given position, a cam to hold the cover cap off the can until the can has been positioned on the arm, and a cam track shaped to allow the cans to be turned to a position below the horizontal to permit water to be drained therefrom during a portion of the time of their travel around the machine.

3. A can draining machine comprising a revoluble spider, a plurality of arms pivoted thereto, a pivotally supported screen cover cap carried by each arm, means to position a can on each arm successively, a cam to hold the screen cover caps off the cans until they have been positioned on the arms, a cam track to permit the cans to be turned to a position below the horizontal to drain the liquid therefrom during a portion of their travel around the machine, and means to discharge the cans into a chute when drained.

4. A can draining machine comprising a revoluble spider carried by a vertical shaft, a plurality of arms pivotally supported by said spider, a screen cover cap pivotally supported by each arm, a spring to hold said screen cap normally in contact with the top of a can placed on an arm, means to place a can on each arm as they successively reach a pre-determined position, means to hold the screen cap off the cans until the can has been positioned by the arm, and a cam track shaped to allow the can supporting arms and cans carried thereby to be turned to a position below the horizontal to drain the liquids therefrom during a portion of the movement of the cans around the machine.

In testimony whereof I have hereunto set my hand this 7th day of July A. D. 1915, in the presence of the two subscribed witnesses.

NARSETE FELIZIANETTI.

Witnesses:
  CARLOS P. GRIFFIN,
  HENRY B. LISTER.